United States Patent

Yeom et al.

[11] Patent Number: 5,943,625
[45] Date of Patent: Aug. 24, 1999

[54] SYSTEM HAVING A DUAL-PURPOSE TELEPHONE AND MOUSE

[75] Inventors: Yun-Pil Yeom, Seoul; Young-Gyoo Choi, Suwon, both of Rep. of Korea

[73] Assignee: SamSung Electronics Co., Ltd., Suwon, Rep. of Korea

[21] Appl. No.: 08/704,278

[22] Filed: Aug. 28, 1996

[30] Foreign Application Priority Data

Aug. 31, 1995 [KR] Rep. of Korea ................. 95-27944

[51] Int. Cl.$^6$ ................................................. H04B 1/38
[52] U.S. Cl. .................. 455/557; 345/157; 455/575; 455/90
[58] Field of Search ........................... 455/550, 556, 455/557, 575, 90, 95, 347; 379/428, 433; 364/705.05; 345/156, 157, 172, 168, 163, 173

[56] References Cited

U.S. PATENT DOCUMENTS

| D. 320,197 | 9/1991 | Weber | 379/364 |
|---|---|---|---|
| 4,661,659 | 4/1987 | Nishimura | 379/61 |
| 4,754,268 | 6/1988 | Mori | 340/710 |
| 5,063,376 | 11/1991 | Chang | 340/710 |
| 5,138,649 | 8/1992 | Krisbergh et al. | 379/56 |
| 5,469,193 | 11/1995 | Giobbi et al. | 345/158 |
| 5,526,402 | 6/1996 | Dent et al. | 455/426 |
| 5,561,437 | 10/1996 | Phillips et al. | 455/575 |
| 5,659,335 | 8/1997 | Partridge, III | 345/157 |
| 5,671,267 | 9/1997 | August et al. | 379/61 |
| 5,706,031 | 1/1998 | Brendzel et al. | 345/172 |

FOREIGN PATENT DOCUMENTS

| 596 594 A1 | 11/1994 | European Pat. Off. . |
|---|---|---|
| 630140-A2 | 12/1994 | European Pat. Off. . |
| 63-224418 | 9/1988 | Japan . |
| 1-319348 | 12/1989 | Japan . |
| 2-198259 | 8/1990 | Japan . |
| 3-148945 | 6/1991 | Japan . |
| 4-51742 | 2/1992 | Japan . |
| 4-160854 | 6/1992 | Japan . |
| 4-354229 | 12/1992 | Japan . |
| 5-130181 | 5/1993 | Japan . |
| 5-130673 | 5/1993 | Japan . |
| 5-153268 | 6/1993 | Japan . |
| 5-268303 | 10/1993 | Japan . |
| 6-14370 | 1/1994 | Japan . |
| 2 216 319 | 10/1989 | United Kingdom . |
| WO 92/14231 | 8/1992 | WIPO . |

*Primary Examiner*—Thanh Cong Le
*Assistant Examiner*—Edan Orgad
*Attorney, Agent, or Firm*—Robert E. Bushnell, Esq.

[57] ABSTRACT

A system providing a remote control device operable both as a cordless telephone and as a computer system having a wireless mouse, with two separate assemblies. The first assembly is a computer system that is connected to a telephone jack. The computer system has a video display unit with a cursor, a modem, and the electronics for a base unit of a cordless telephone built inside the chassis. The second assembly is the remote control unit, and serves both as a handset for a cordless telephone and as a wireless mouse. The handset can place and receive telephone calls by communicating, via electromagnetic radiation to the computer system hooked up to the telephone jack. The handset can also control the position and functions of the cursor on the video display screen when not being used as a telephone. The remote control unit has a mouse button and another cursor control device.

20 Claims, 5 Drawing Sheets

SYSTEM HAVING A DUAL-PURPOSE TELEPHONE AND MOUSE

CLAIM FOR PRIORITY

This application makes reference to, incorporates the same herein, and claims all benefits accruing under 35 U.S.C. §119 arising from an application for *Dual Purpose Telephone and Wireless Mouse* earlier filed in the Korean Industrial Property Office, on Aug. 31, 1995 and there duly assigned Ser. No. 27944/1995.

FIELD OF THE INVENTION

The present invention relates to an appliance that serves both as a cordless telephone and as a computer with a wireless mouse, and more particularly, to a base unit of a cordless telephone is located inside the computer chassis while a mouse ball and mouse buttons located on the handset of the cordless telephone, enable the handset of the cordless telephone to remotely control a personal computer.

BACKGROUND OF THE INVENTION

A mouse enables a user to control the position of a cursor on a video display connected to a personal computer. Recent efforts in the art have, with varying degrees of success, endeavored to establish wireless mice as useful peripherial devices with a computer system. As U.S. Pat. No. 4,754,268 for a *Wireless Mouse Apparatus* to Mori explains, wireless mice can be classified into two conventional types—the mechanical type that uses a mechanical transducer such as a trackball to operate, and an optical type that requires the wireless mouse to be used on a reflective pad. In both types, the wireless mouse communicates to the personal computer by way of radio waves or infrared electromagnetic radiation. With either type, the user is not confined by a cord extending form the personal computer to the mouse. Other literature in the art discuss a cordless device that operates as a mouse to move the cursor around on a personal computer. Examples of these may be found in U.S. Pat. No. 5,469,193 for a *Cordless Pointing Apparatus* to Giobbi et al and another in European Patent 0596,594 for a *Remote Control and Pointing Device* to Frank.

The notion of having the base unit of a cordless telephone located within a computer has been attempted in U.S. Pat. No. 4,661,659 for a *Wireless Phone System Communicatively Combined with a Computer* to Nishimura, by installing the base unit of the cordless telephone inside of a computer. As a result, the computer, containing the base unit, is connected to the telephone jack. Both the computer and the handset have antennas so that they can communicate with each other. In addition, the handset has a microphone, a speaker, a keypad, and a display. The handset can function as a conventional telephone or can communicate data to or from the computer. If the handset is used to communicate data through a telephone line to the master computer, the speaker and the microphone are used as a conventional acoustic coupler. Although the remote handset may send and receive data from the master computer, the remote handset does not appear to operate as a mouse or to perform the functions of a typical mouse, as in controlling the position of a cursor on a display terminal.

The notion of using a hinge operated protective cover to protect features on a telephone hand or slave set has been mentioned in JP1-319348, which shows a telephone set having speaker, a microphone and a push button section. When the slave set unit folds to a closed position, the push buttons, the microphone, and the speaker are protected. A hinge is formed along the middle of the slave set unit to allow both ends of the slave set unit to fold over onto each other, protecting the microphone, push buttons, and the speaker inside.

Other efforts, such as JP6-14370 using a cordless telephone that, in addition to operating as a telephone, allows the slave set to also be used to remotely control a television set. JP5-130181 using a cordless telephone set where the slave set can, in addition to functioning as a handset for a cordless telephone, function as a remote control for audio/visual equipment and air conditioning equipment. The slave set can communicate to these apparatuses by infrared radiation. JP5-130673 has a cordless telephone, where the slave set may, in addition to functioning as a handset, be used to remotely control apparatus such as a television receiver. Such remote control is accomplished by infrared radiation. JP5-268303 provides a cordless telephone set where the slave set can function both as a handset for the cordless telephone and as a remote controller for a variety of appliances such as air conditioners, television sets, and home appliances. The slave set can remotely control these various apparatuses while a user is busy conversing. JP5-153268 shows a cordless telephone set that can monitor household appliances such as washing machines. With this equipment, when the washing machine cycle is finished, a signal is sent to the slave set that converts the signal into sound signal so that a user can be alerted to the fact that the washing machine cycle is complete. JP4-51742 uses a cordless telephone set that can operate both as a cordless telephone or as a modem for a personal computer. A switch on the slave set enables a user to choose between speech mode and data transmission mode. Another cordless telephone set shown in JP4-354229, also operates either as a cordless telephone or as a modem for a personal computer. The slave set is electrically connected to the personal computer. A switch on the slave set enables a user to choose between voice mode or data transmission mode. JP3-148945 uses a cordless telephone, where the slave set can function both as a handset for the cordless telephone or as a remote controller for various appliances such as television sets and air conditioners. As shown in a figure, the slave set can also be used to remotely control a personal computer. JP2-198259 also uses a cordless telephone that can function both as a telephone and as a remote controller for various equipment. Optical pulses are emitted from the slave set of the cordless telephone to operate the various appliances. JP4-160845 provides a cordless telephone that can function both as a telephone and as a remote control for a facsimile machine. Both the facsimile machine and the master unit are plugged into the telephone jack. The slave set remotely control both the master unit and/or the facsimile unit. JP6-224418 suggests a cordless telephone that can be used to control a personal computer, while EP 630140-A has a cordless telephone that can be used to remotely control a facsimile machine, and UK 2 216 319A provides a cordless telephone with a handset can be used to access navigational information from a computer.

Despite these numerous examples of using the telephone handset to perform remote control functions, the art has failed to either appreciate the need for, or to construct a telephone handset that can also function as a wireless mouse for a personal computer. Nevertheless, U.S. Pat. No. Des. 320,197 to Weber discloses the ornamental design of a mouse with a dial telephone pad. The figures show a tracking ball as well as a telephone keypad, together on one device. The figures show a cord emanating from the rear of the device. This ornament does not however provide a cordless telephone endowed with the ability to functionally operate a computer.

SUMMARY OF THE INVENTION

It is therefore an object of the present invention to provide an improved computer peripheral device.

It is another object to incorporate a mouse and a telephone into a single, integrated computer peripheral.

It is yet another object to provide an integrated peripheral device able to operationally function as a mouse and as a telephone, in conformance with selections of operational modes by a user.

It is still another object to provide a single device able to function as both a wireless mouse and as a handset for a cordless telephone at the discretion of the user, allowing the user to place telephone calls, receive telephone calls, and position the cursor on a personal computer screen, all from a remote location.

It is also an object to provide a dual-purpose telephone and wireless mouse in which telephone functions are added to a mouse used with a computer, and, when needed, the communication functions installed in the computer can be easily utilized.

These and other objects may be achieved by installing the base unit of a cordless telephone inside of the chassis of either a laptop computer or a personal computer, and by having a separate remote control unit that can function both as a wireless mouse for the computer and as a handset for a cordless telephone, selective at the discretion of the user. The remote control unit may be constructed with a microphone, a speaker, a keypad, an antenna, a mouse or trackball, a mouse button, and a selection switch that allows the user to choose between a mouse operational mode and a cordless operational telephone mode. The personal or laptop computer containing the base unit of the cordless telephone is connected to the telephone jack. From this single remote control unit, the user can place or receive telephone calls as well as operate the computer by, for example, being able to position the cursor on the video screen attached to the computer to initiate and selectively designate functional and operational selections from menus displayed on the screen.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
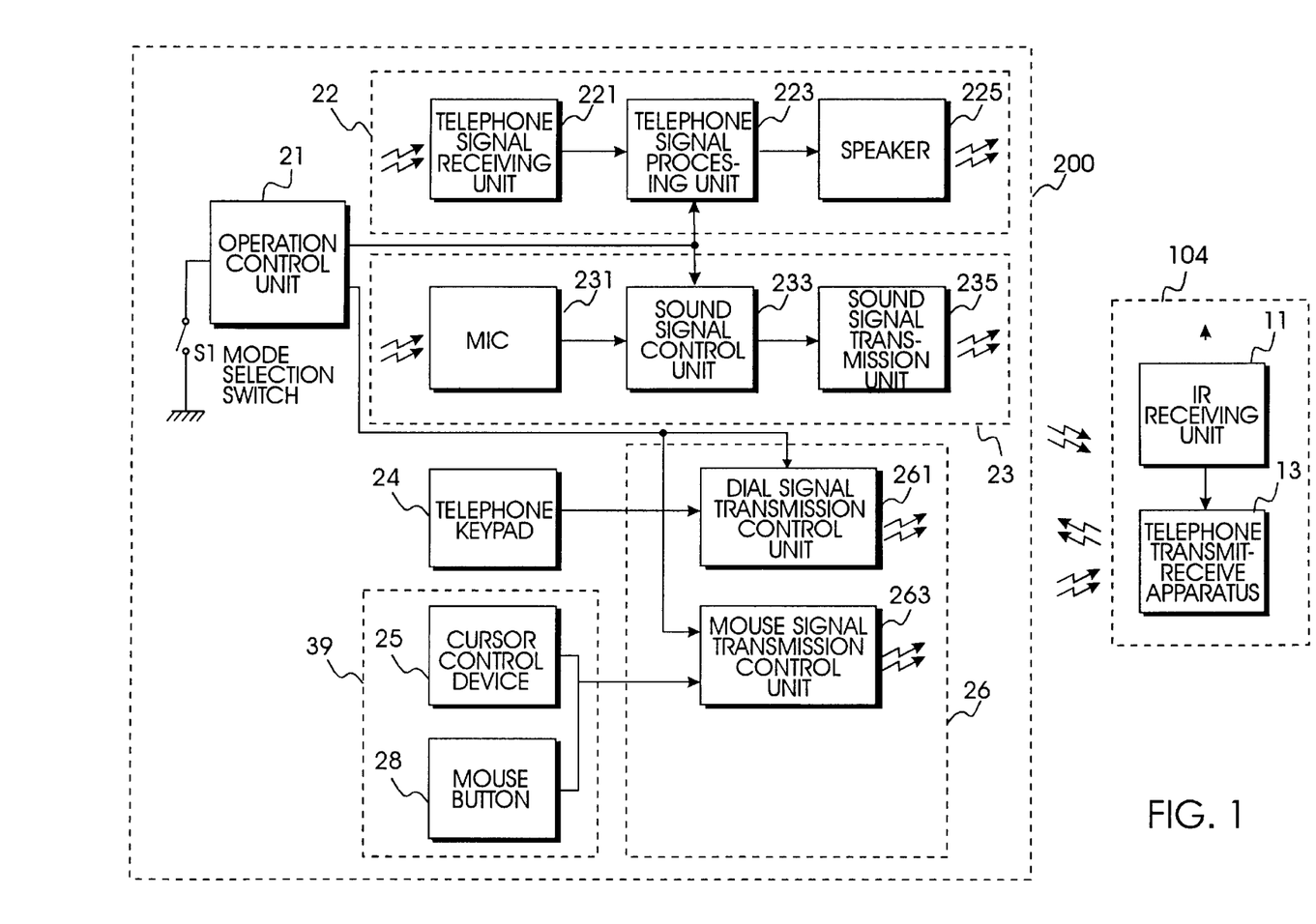
FIG. 1 is a block diagram of the circuit configuration of a dual-purpose cordless telephone and wireless mouse constructed in accordance with the principles of the present invention.
Figure 8:
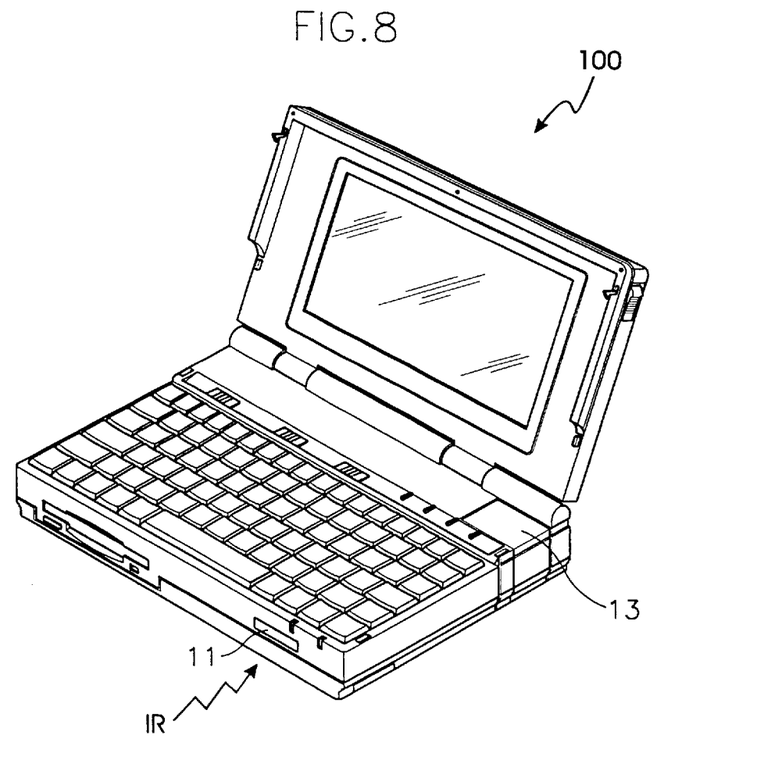
FIG. 8 is a structure diagram of a lap-top personal computer that incorporates the base unit of a cordless telephone which are to be used together with the remote control device illustrated by FIGS. 2 through 7 into one embodiment of the principles of the present invention.
Figure 9:
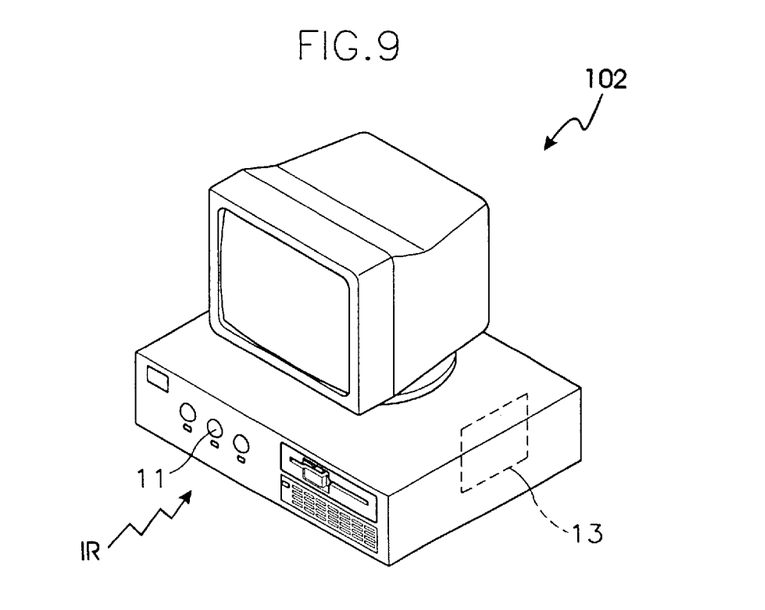
FIG. 9 is a structure diagram of a desk-top personal computer which incorporates the base unit of a cordless telephone to be used together with the remote control device illustrated by FIGS. 2 through 7 as another embodiment of the principles of the present invention.

Turning now to the drawings, as it is illustrated in FIG. 1, the assembly of a dual-purpose cordless telephone and wireless mouse is constructed as a preferred embodiment of the present invention is formed by two separate assemblies. The first assembly is computer system 104, examples of which are shown in FIGS. 8 and 9. Computer system 104 is connected to a telephone jack and includes, inside the chassis, a modem as well as electronics that function as a base unit for a cordless telephone. The second assembly is the remote control unit 200, and is shown in FIGS. 2 through 7. Remote control unit 200 is physically separated from any appliance and communicates with computer system 104 via electromagnetic radiation. Remote control unit 200 can function either as a wireless mouse or as a handset for a cordless telephone. On remote control unit 200 is mode selection knob 29. Depending on the position of mode selection knob 29, the remote control unit 200, together with computer system 104, both operate in concert as either a cordless telephone or as a computer having a wireless mouse and a modem. FIG. 1 is a block diagram showing the interrelation between the elements of remote control unit 200 and the elements of computer system 104.

Remote control unit 200 is made up of a mode selection switch S1, an operation control unit 21, according to the operational state of the mode selection switch S1, enables certain circuits and disables others; a receiver 22 connected to operation control unit 21, where receiver 22 controls and outputs the aural sound signal in accordance with a telephone ring signal; a transmitter 23 connected to operation control unit 21, where transmitter 23 controls and transmits the user's sound signal; keypad 24 for dialing a telephone number; mouse signal input devices 39 made up of a mouse button 28 and a cursor control device 25 which could be a mouse ball, a mouse trackball, a touchpad, or some other control input device that is separate from mouse button 28; a mouse selection switch S2, and a signal transmission control portion 26, that is further made up of a keypad signal transmission control unit 261 and a mouse signal transmission control unit 263.

The above receiver 22 is constructed with telephone signal receiving unit 221 that receives the telephone signal through antenna 222 sent from a telephone transmit-receive apparatus 13; a telephone signal processing unit 223 that controls and outputs the telephone signal from telephone signal receiving unit 221, and a speaker 225 which converts the signals from telephone signal processing unit 223 into aural signals.

The above transmitter 23 is made up of a microphone 231 that, when the telephone is enabled by operation control unit 21, converts a user's aural voice into an electronic signal; a sound signal output unit 233 that controls the sound signal from microphone 231; and sound signal transmission unit 235 that transmits the user's voice to the telephone transmit-receive apparatus 13 inside computer system 104.

In addition to showing remote control device 200 which is a combined cordless telephone handset and a wireless mouse, FIG. 1 also shows a computer system 104 having telephone transmit-receive apparatus 13, receiving unit 11, a base unit for a cordless telephone, and a modem, all built inside. FIGS. 8 and 9 respectively show two different embodiments of computer system 104, both containing central processing units that are not separately shown. FIG. 8 shows laptop computer 100 while FIG. 9 shows desktop computer 102. Both laptop computer 100 and desktop computer 102 include transmit and receive apparatus 13, receiving unit 11, a base unit for a cordless telephone, and a modem built inside the chassis. The telephone transmit and receive apparatus 13 transmits and receives radio frequency electromagnetic radiation to and from remote control device 200. As with standard cordless telephones, the transmit frequency is different from the receive frequency, allowing both conversers to talk at the same time. Telephone transmit and receive apparatus 13 transmits to receiver 22 while sound signal transmission unit 235 and dial signal transmission control unit 261 transmit to telephone transmit and receive apparatus 13 in computer system 104. Meanwhile, receiving unit 11 of computer system 104 receives electro-magnetic signals only from mouse signal transmission control unit 263. These signals originate from cursor control device 25 and from mouse button 28. In one embodiment, the electromagnetic radiation transmitted from mouse signal transmission control unit 263 to receiving unit 11 of computer system 104 is infrared, restricting mouse operations only to where there is direct line of sight between remote control unit 200 and computer system 104. In a separate embodiment, however, it is possible to transmit and receive mouse control signals at a radio frequency, avoiding this limitation.

Figure 2:
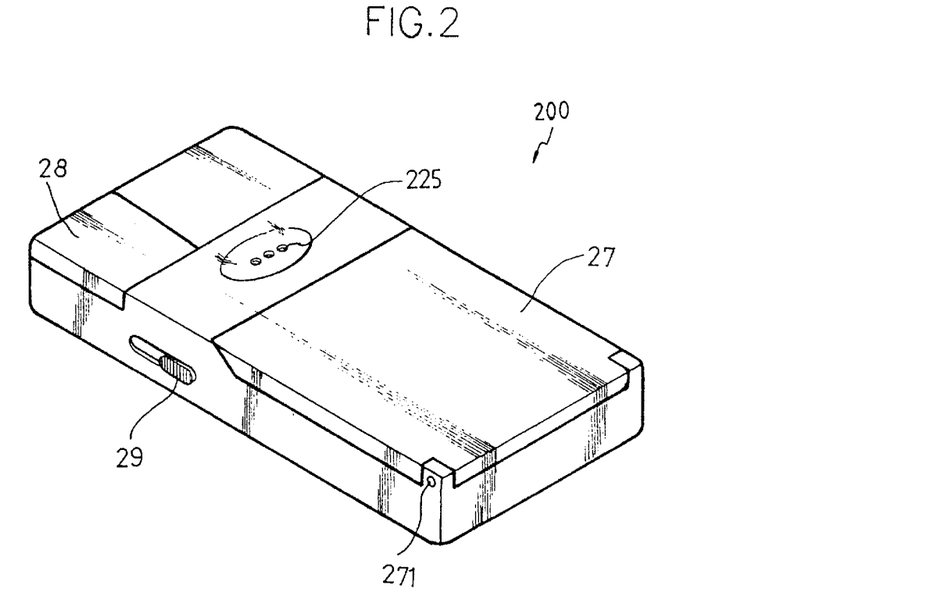
FIG. 2 is a perspective diagram of the remote control device for an embodiment of the present invention where a protective cover is covering the telephone dial pad as in the situation of where the remote device is being used as a cordless mouse.
Figure 6:
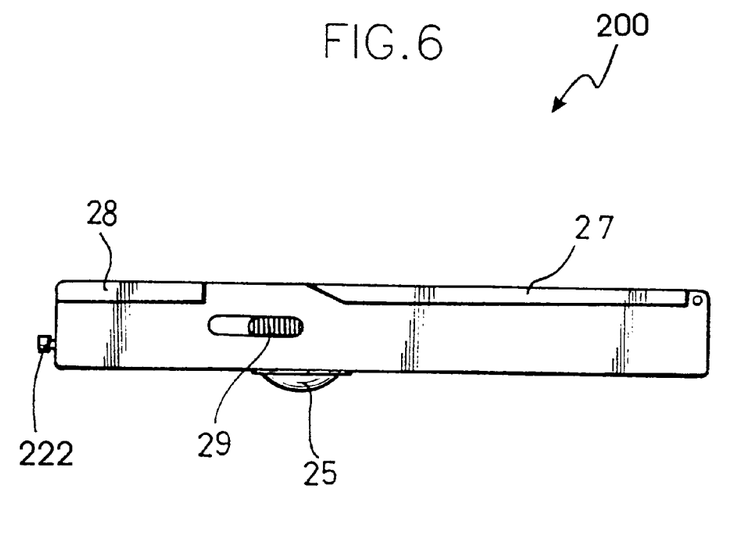
FIG. 6 is a left side view of the remote control device constructed in accordance with the principles of the present invention.
Figure 7:
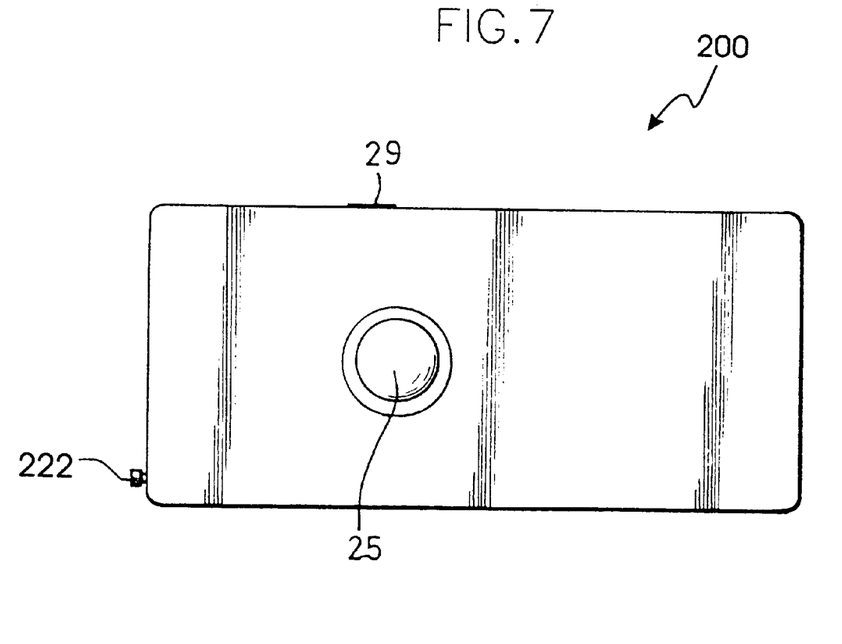
FIG. 7 is a bottom view of a remote control device constructed as a preferred embodiment of the present invention.

The remote control unit 200 is shown in FIGS. 2–7. As seen in FIG. 2, mouse button 28, speaker 225, and protection cover 27 are formed on the top side of remote control unit 200. Protection cover 27 rotates on hinge 271. When protection cover 27 is opened, keypad 24 becomes accessible and allows the user place a call. Microphone 231 is formed on the inside of protection cover 27 and is also exposed only when protection cover 27 is opened. Also, as is illustrated in FIG. 6, the backside of remote control unit 200 contains cursor control device 25 that, together with mouse button 28, define mouse signal input devices 39.

The following is the application of the present invention structured as previously described. In the preferred embodiment of the present invention, general telephone functions are added to those of a mouse, used in desk or lap-top computers. If a telephone call comes in, the telephone transmit-receive apparatus 13 transmits a signal for telephone reception to remote control unit 200. The telephone reception signal (or ring signal) is transmitted from the telephone transmit-receive apparatus 13 that is mounted in computer system 104, and is received by receiver 22 mounted in remote control unit 200. Through telephone signal processing unit 223 and speaker 225, the signal is converted to an aural signal as it is output to the user.

Figure 3:
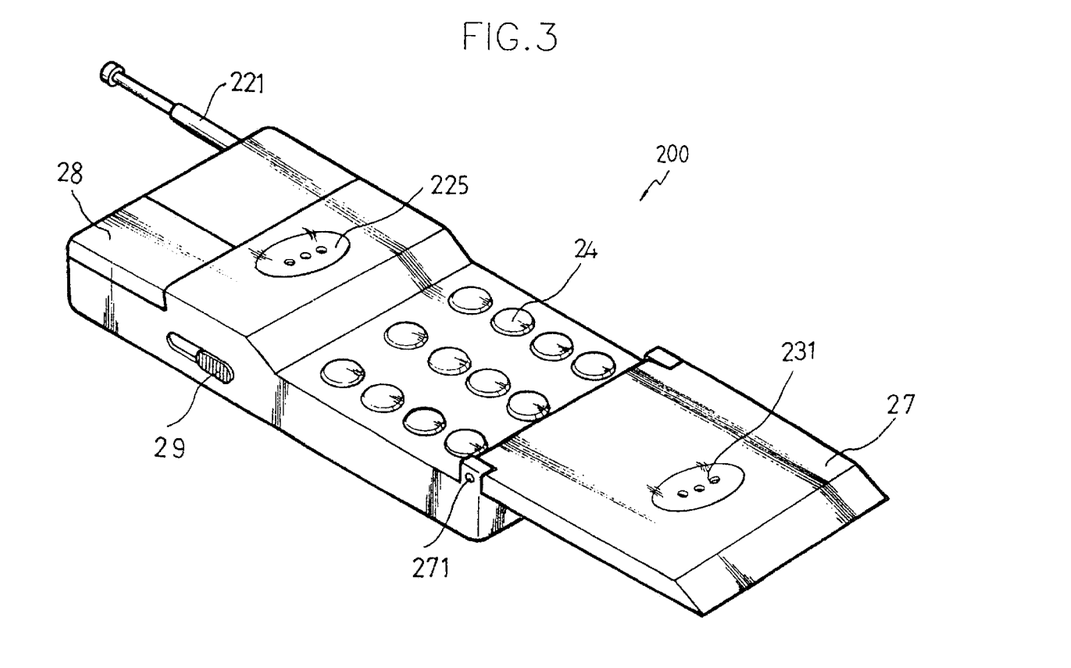
FIG. 3 is a perspective diagram of the remote control device for an embodiment of the present invention where the telephone keypad exposed as in the situation where the remote control device is being used as a cordless telephone.
Figure 4:
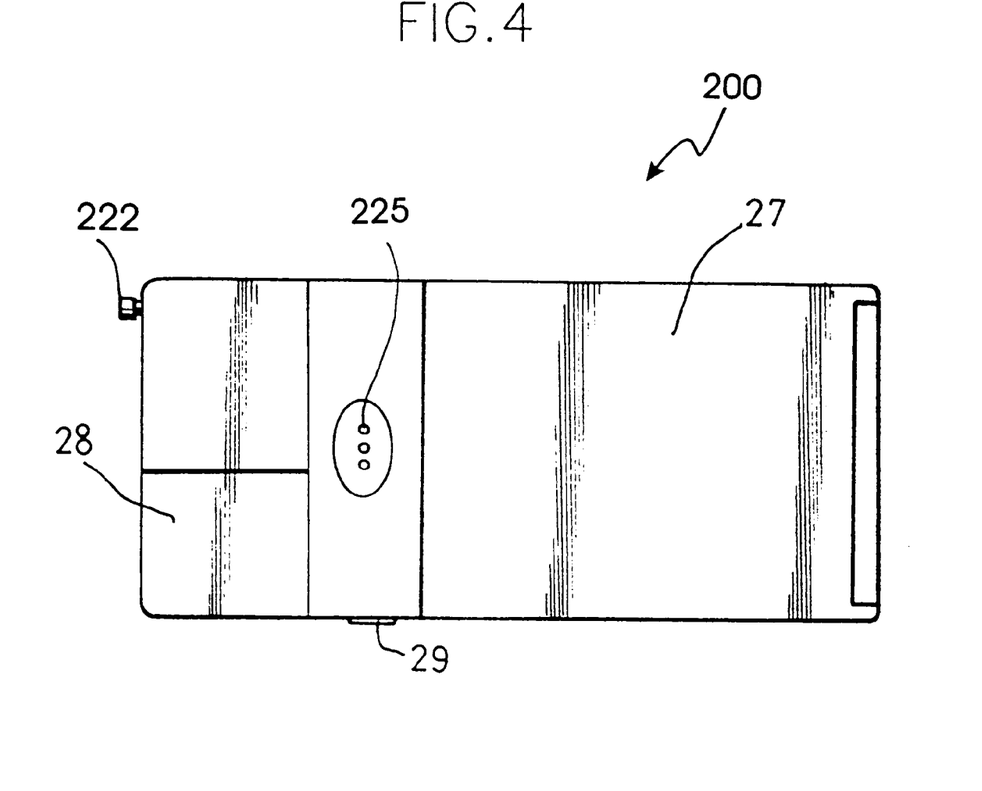
FIG. 4 is a top view of the remote control device constructed in accordance with the principles of the present invention.
Figure 5:
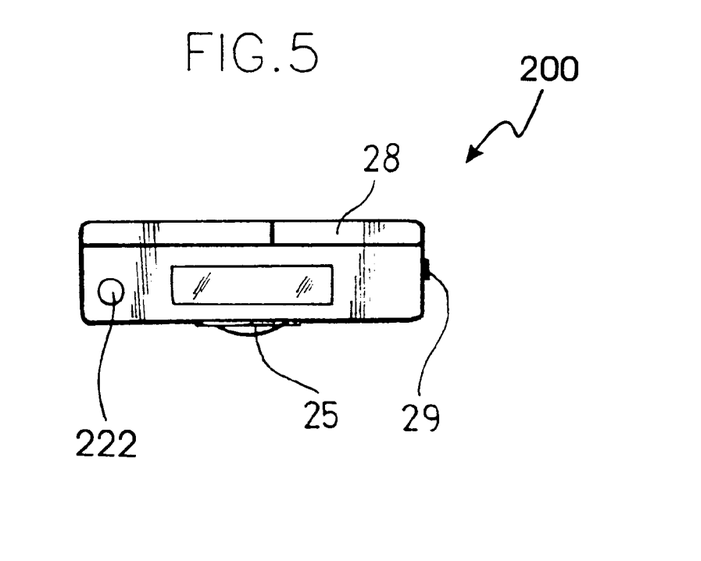
FIG. 5 is a front view of the remote control device constructed in accordance with the principles of the present invention.

When the user hears and responds to the ringing signal put out by speaker 225 indicating that a call has come in, the user opens protection cover 27 of remote control unit 200 as is illustrated in FIG. 3, extends antenna 222, and sets the mode selection knob 29 to the telephone mode position. According to the setting of the mode selection knob 29, the operation state of mode selection switch S1 is changed, and if a telephone ring signal is detected, operation control unit 21 enables transmitter 23 to operate. At the same time, mouse signal transmission control unit 263 is disabled, desensitizing cursor control device 25 and mouse button 28. In addition, the modem inside computer system 104 is disabled as is illustrated in table 1 below when mode selection knob 29 is set to the telephone mode position. In this state, the user is able to talk to the caller through microphone 231 formed in protection cover 27. The voice signal of the user, after being changed to an electronic signal by microphone 231, passes through sound signal control unit 233, and after advancing to the sound signal transmission unit 235, the voice is transmitted to the telephone transmit-receive apparatus 13 installed in computer system 104, where it is sent out over the telephone line to the caller.

When the user wishes to place a call, the number is dialed by using keypad 24 located on remote control unit 200. Providing the mode selection knob 29 is set to telephone mode by the user, operation control unit 21 enables the dial signal transmission control unit 261 to transmit the input telephone number to telephone transmit-receive apparatus 13 of computer system 104, and the base unit inside computer system 104 places the call out onto the telephone line. While telephone calls are transmitted and received in the above manner, computer system 104 and the modem cease to operate, as they remain in a stand-by state as illustrated in Table 1 below.

After the telephone call is completed, if the user switches the mode selection knob 29 to the mouse mode position, the operational state of the mode selection switch S1 is changed, causing operation control unit 21 to disable dial signal transmission control unit 261 and enable mouse signal transmission control unit 263 as illustrated in table 1 below.

When in mouse mode, the user closes protection cover 27 and returns antenna 222 to a collapsed state, as is shown in FIG. 2. Next, cursor control device 25 and mouse button 28 are sensitized, meaning that manual manipulations of mouse signal input devices 39 in remote control unit 200 are transmitted to the computer system 104 where they are used to control the cursor on the video display monitor. It is mouse signal transmission control unit 263 of remote control unit 200 that transmits, by electromagnetic radiation, signals originating from mouse signal input devices 39 to computer system 104, allowing the user to manipulate the position and functions of the cursor on the computer screen from a remote location. While in mouse mode, computer system 104 is free to use the modem to transmit and receive computer data over the telephone line as illustrated in Table 1 below:

TABLE 1

| | Enabled Units in Telephone Mode | Enabled Units in Mouse Mode |
|---|---|---|
| 1 | Mouse Signal Transmission control unit 263 | Transmitter 23 |
| 2 | Infrared Receiving Unit 11 | Receiver 22 |
| 3 | Modem | Telephone Transmit-Receive Apparatus 13 |
| 4 | Mouse Signal Input Devices 39 | Dial Signal Transmission Control Unit 261 |

Switching between telephone mode and mouse mode is ordinarily accomplished by toggling mode selection knob 29 on remote control twit 200; a different embodiment allows mode switching between telephone and mouse mode through user manipulation of the keys of keypad 24.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A dual-purpose telephone and wireless mouse, comprising:
   a mode selection unit enabling user selection between a mouse function and a telephone function;
   a receiver having a speaker controlling transmission of an audible signal from a caller during a telephone call;
   a transmitter having a microphone controlling transmission of an audible signal from a user during the telephone call;
   a keypad unit comprising a keypad generating an input signal in response to manual entry on said keypad;
   mouse signal input devices, comprising a cursor control device governing movement of a cursor within a field displaying varying visible images and a mouse button activating functions corresponding to some of said images, when operated, generating an input signal corresponding to manual entry on said cursor control device and said mouse button;
   an operation control unit generating a control signal enabling the functions of the selected telephone function and mouse function according to the user selection of said mode selection unit; and
   a signal transmission control portion, depending upon the control signal from the operation control unit, controlling transmission of the input signal selectively through the keypad unit and the mouse signal input devices.

2. The dual-purpose telephone and wireless mouse of claim 1, further comprising a telephone transmit-receive apparatus that is installed in the computer system and, when a telephone call is received, controlling transmission of the input signal allowing for communication with the caller, via the signal transmitted from the transmitter.

3. A dual-purpose telephone and wireless mouse, comprising:
   a mode selection unit enabling user selection between a mouse function and a telephone function;
   a receiver having a speaker controlling transmission of an audible signal from a caller during a telephone call;
   a transmitter having a microphone controlling transmission of an audible signal from a user during the telephone call;
   a keypad unit comprising a keypad generating an input signal in response to manual entry on said keypad;
   mouse signal input devices, comprising a cursor control device governing movement of a cursor within a field displaying varying visible images and a mouse button activating functions corresponding to some of said images, when operated, generating an input signal corresponding to manual entry on said cursor control device and said mouse button;
   an operation control unit generating a control signal for enabling the telephone function and the mouse function according to the user selection of said mode selection unit; and
   a signal transmission control portion, depending upon the control signal from the operation control unit, controlling transmission of the input signal selectively through the keypad unit and the mouse signal input devices, said signal transmission control portion comprising:
      a dial signal transmission control unit changing an operational state, and controlling transmission of the input signal from said keypad unit according to the control signal from the operation control unit; and
      a mouse signal transmission control unit changing an operational state, and controlling transmission of the input signal from the mouse signal input devices according to the control signal from the operation control unit, and the user selection of the mouse selection unit.

4. The dual-purpose telephone and wireless mouse of claim 3, further comprising a mode selection knob connected to alter operation of said mode selection unit to conform with a current setting of said mode selection knob.

5. The dual-purpose telephone and wireless mouse of claim 3, further comprising:
   said cursor control device positioned on a first exterior surface for performing normal mouse functions, positioning a cursor across a variable visual display; and
   said mouse button being positioned on a second and different exterior surface, and a cover rotatably attached to cover said keypad.

6. The dual-purpose telephone and mouse of claim 5, further comprised of:
   said microphone being mounted within said cover; and
   said cover having a closed position for shielding said keypad and said speaker and having an open position for exposing said keypad and said speaker to a user.

7. The dual purpose telephone and mouse of claim 4, comprised of said keypad responding to manual entry by altering operation of said mode selection unit.

8. A system comprising dual purpose telephone and mouse, comprising:
   a computer system having a chassis and a video display unit, said computer system having a modem connectable to a telephone jack;
   a base unit of a cordless telephone located inside said chassis of said computer system, said base unit being connectable to said telephone jack, said base unit comprising:
      first receiving means for receiving electromagnetic communications for said base unit of said cordless telephone inside said computer system; and
      transmitting means for transmitting electromagnetic radiation from said base unit of said cordless telephone inside said computer system;
      second receiving means for receiving electromagnetic communications for said computer system; and
   a remote control device, comprising:
      a cursor control device converting manual user movements into electrical signals to enable a user to control a position of a cursor within a variable visual display provided by said video display unit;
      a mouse button converting manual first user input into electrical signals to enable a user to control said position of said cursor within said variable visual display provided by said video display unit;
      an antenna extending from said remote control device for receiving electromagnetic communications from said transmitting means;
      a keypad converting manual second user input into electrical signals to enable a user to place a telephone call;

a telephone signal receiving unit receiving a signal from said antenna;

a telephone signal processing unit receiving a signal from said telephone signal receiving unit for controlling said signal from said telephone signal receiving unit;

a speaker receiving a signal from said telephone signal processing unit and converting said signal from said telephone signal processing unit into first aural signals;

a microphone receiving second aural signals from a user and converting said second aural signals into electrical signals;

a mode selection unit enabling user selection between a mouse function and a telephone function;

an operation control unit generating control signals for enabling the functions of the selected telephone function and mouse function according to the setting of said mode selection unit;

an aural signal transmission unit controlling said electrical signals from said microphone and converting said electrical signals from said microphone into first electromagnetic signals, and for transmitting said first electromagnetic signals to said first receiving means;

a dial signal transmitter changing its operational state, and controlling and transmitting the signal from said keypad unit according to the signal from the operation control unit, converting said electrical signals from said keypad into second electromagnetic signals and for transmitting said second electromagnetic signals to said first receiving means;

a mouse signal transmitter, controls and transmits the inputted signal according to the signal from the operation control unit, changes its operation state, and, according to the signal from the mouse signal input unit and setting of the mouse selection switch, receiving said electrical signals from said cursor control device and from said mouse button, and for converting said electrical signals into third electromagnetic signals, and for transmitting said third electromagnetic signals to said second receiving means; and a mode select switch having a telephone mode position and a mouse mode position, said mode select switch operationally enabling said mouse signal transmitter, said second receiving means, and said modem while said mode select switch is in said mouse mode position, said mode select switch operationally enabling said dial signal transmitter, said aural signal transmission unit, said telephone signal processing unit, said first receiving means and said transmitting means while said mode select switch is in said telephone mode position.

9. The system of claim 8, with said remote control device comprised of:

a main body; and a cover, said cover being movable between an open position and a closed position, said cover covering said keypad and said microphone while in said closed position, said cover exposing said microphone and said keypad while in said open position.

10. The system of claim 9, comprised of a pair of hinges pivotally attaching said cover to said main body of said remote control unit.

11. The system of claim 8, comprised of said second receiving means operationally responding to reception of infrared radiation.

12. The system of claim 11, with said mouse signal transmitter comprising an emitter of infrared radiation.

13. The system of claim 8, comprised of said second receiving means receiving electromagnetic communications for said computer system at a radio frequency.

14. The system of claim 13, comprised of said mouse signal transmitter generating radio frequency signals.

15. The system of claim 8, said mouse signal transmitter, said second receiving means, and said modem can be operationally enabled by user inputs on said keypad on said remote control unit.

16. The system of claim 8, said dial signal transmitter, said aural signal transmission unit, said telephone signal processing unit, said first receiving means, and said transmitting means are operationally enabled by user inputs on said keypad on said remote control unit.

17. A system comprising a dual purpose telephone and mouse, comprised of:

a computer system comprising a chassis, a central processing unit, a video display unit variably driven to provide a visual video display by said central processing unit, and a modem connectable to a telephone jack;

a base unit of a cordless telephone located inside said chassis of said computer system, said base unit being connectable to said telephone jack, said base unit comprising:

first receiving means positioned within said chassis, for receiving electromagnetic communications for said base unit of said cordless telephone; and transmitting means positioned within said chassis, for transmitting electromagnetic radiation from said base unit of said cordless telephone;

second receiving means for receiving electromagnetic communications for said computer system; and a remote control device operationally deployable outside of and spaced-apart from said chassis, comprising:

a mode selection unit enabling user selection between a mouse function and a telephone function;

an operational control unit generating control signals for enabling the functions of the selected telephone function and mouse function according to the setting of said mode selection unit;

a cursor control converting manual movements of the user into electrical signals to enable the user to control a position of a cursor within said visual video display;

a mouse button converting manual first input from the user into electrical signals to enable the user to control interaction between said cursor and said variable visual display provided by said video display unit;

an antenna extending from said remote control device for receiving electromagnetic communications from said transmitting means;

a keypad converting manual second input from the user into electrical signals to enable the user to select a number assigned to any telephone service subscriber and to place a telephone call to that subscriber via said number assigned;

a dial signal transmitter changing its operational state, and controlling and transmitting the signal from said keypad unit according to the signal for the operation control unit, responding to enablement of said telephone function by converting said electrical signals from said keypad into first electromagnetic signals and transmitting said first electromagnetic signals to said first receiving means; and a mouse signal transmitter controls and transmits the inputted signal according to the signal from the operation control unit changes its operation state, and, according to the signal from the mouse signal input unit and setting of the mouse selection switch, responding to enablement of said mouse function by receiving said electrical signals from said cursor control and from said mouse button, converting said electrical signals into second electromagnetic signals, and transmitting said second electromagnetic signals to said second receiving means.

18. The system of claim 17, with said remote control device further comprised of:

a telephone signal receiving unit receiving a signal from said antenna;

a telephone signal processing unit converting said signal from said telephone signal receiving unit into audio frequency signals;

a speaker for broadcasting said audio frequency signals;

a microphone receiving aural signals from a user and converting said aural signals into electrical signals; and an aural signal transmission unit converting said electrical signals into third electromagnetic signals, and transmitting said third electromagnetic signals to said first receiving means.

19. The system of claim 17, further comprising:

said cursor control being positioned on a first exterior surface of said remote control device for performing normal mouse functions by positioning a cursor across a variable visual display;

said mouse button being positioned on a second and different exterior surface of said remote control device; and a cover rotatably attached to said remote control device to shield said keypad.

20. The system of claim 19, further comprised of:

said microphone being mounted within said cover; and said cover having a closed position for enclosing said keypad and said speaker and having an open position for exposing said keypad and said speaker to a user.

* * * * *